April 28, 1959 L. H. MORIN 2,883,707
MACHINE FOR MOULDING, FORMING AND TRIMMING PLASTIC PRODUCTS
Filed July 20, 1956 13 Sheets-Sheet 1

INVENTOR.
LOUIS H. MORIN
BY
*Howard E. Thompson*
ATTORNEY.

April 28, 1959 L. H. MORIN 2,883,707
MACHINE FOR MOULDING, FORMING AND TRIMMING PLASTIC PRODUCTS
Filed July 20, 1956 13 Sheets-Sheet 2

INVENTOR.
LOUIS H. MORIN
BY
ATTORNEY.

April 28, 1959  L. H. MORIN  2,883,707
MACHINE FOR MOULDING, FORMING AND TRIMMING PLASTIC PRODUCTS
Filed July 20, 1956  13 Sheets-Sheet 3

INVENTOR.
LOUIS H. MORIN
BY
Howard Thompson
ATTORNEY.

April 28, 1959      L. H. MORIN      2,883,707
MACHINE FOR MOULDING, FORMING AND TRIMMING PLASTIC PRODUCTS
Filed July 20, 1956      13 Sheets-Sheet 4

INVENTOR
LOUIS H. MORIN
BY
     Howard C. Thompson
ATTORNEY

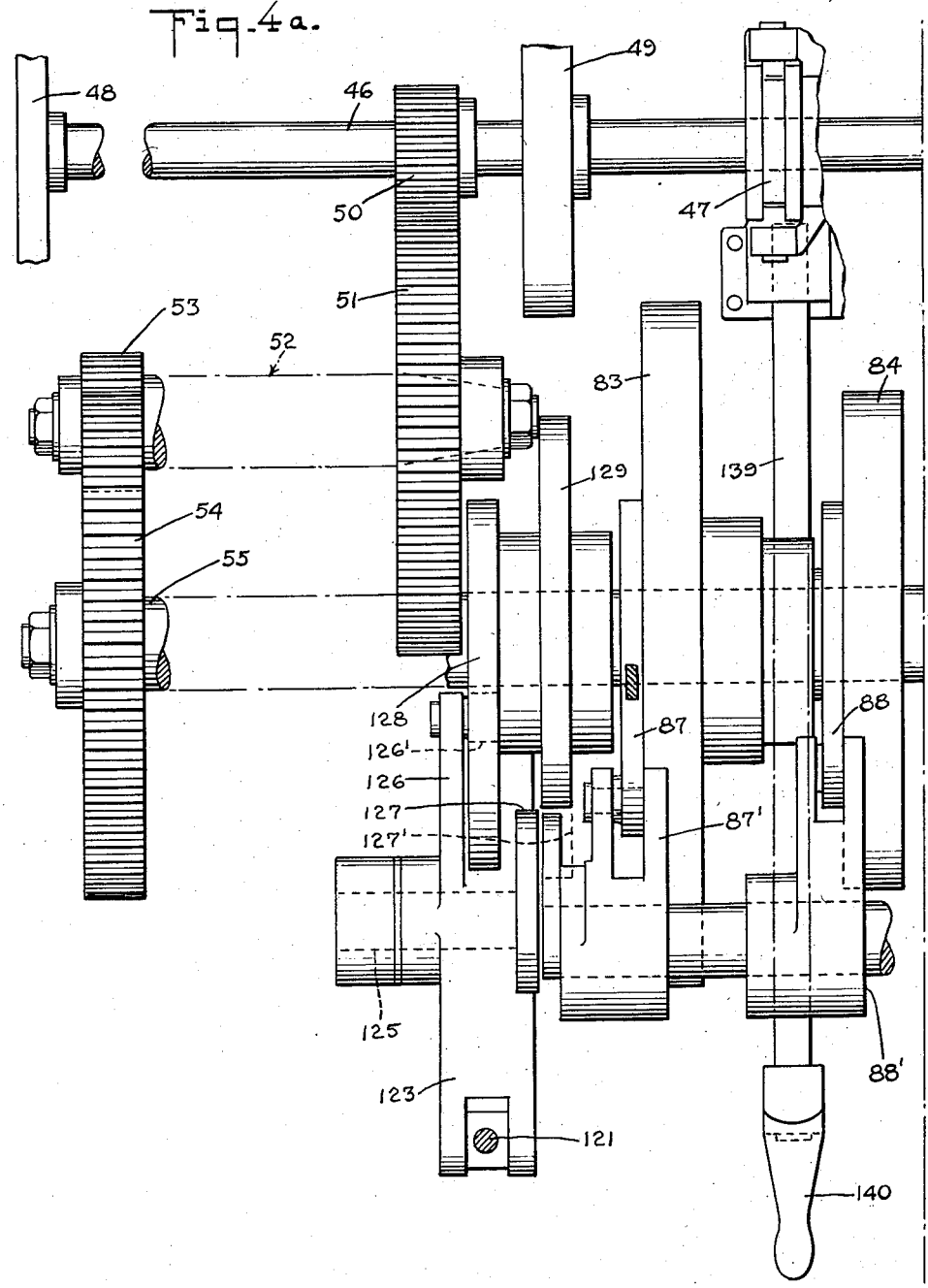

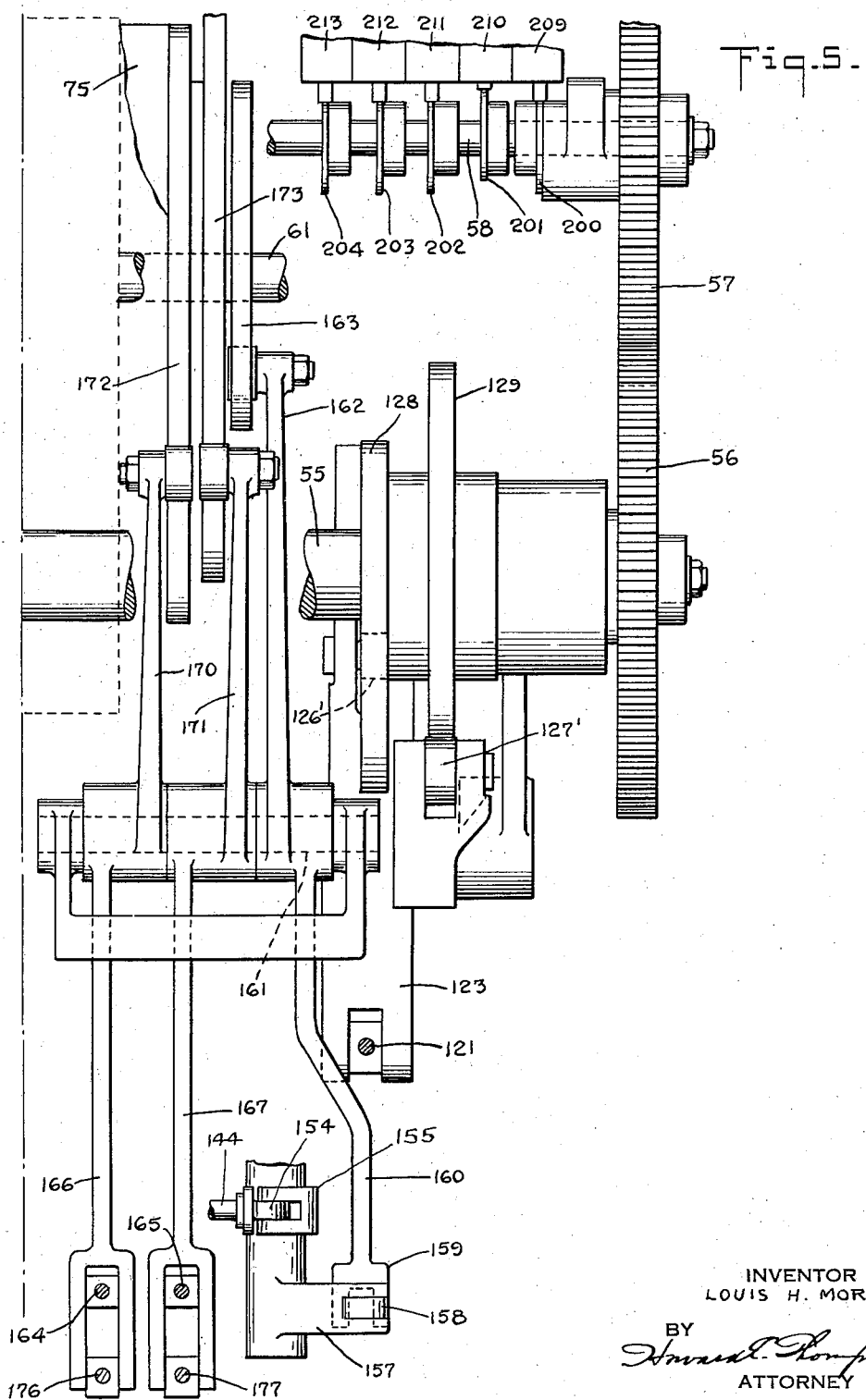

April 28, 1959    L. H. MORIN    2,883,707
MACHINE FOR MOULDING, FORMING AND TRIMMING PLASTIC PRODUCTS
Filed July 20, 1956    13 Sheets-Sheet 7

INVENTOR.
LOUIS H. MORIN
BY
*Howard Thompson*
ATTORNEY

April 28, 1959 L. H. MORIN 2,883,707
MACHINE FOR MOULDING, FORMING AND TRIMMING PLASTIC PRODUCTS
Filed July 20, 1956 13 Sheets-Sheet 8

INVENTOR.
LOUIS H. MORIN
BY
*Howard E. Thompson*
ATTORNEY.

April 28, 1959 L. H. MORIN 2,883,707
MACHINE FOR MOULDING, FORMING AND TRIMMING PLASTIC PRODUCTS
Filed July 20, 1956 13 Sheets-Sheet 9

INVENTOR.
LOUIS H. MORIN
BY
ATTORNEY

April 28, 1959 L. H. MORIN 2,883,707
MACHINE FOR MOULDING, FORMING AND TRIMMING PLASTIC PRODUCTS
Filed July 20, 1956 13 Sheets-Sheet 10

INVENTOR.
LOUIS H. MORIN
BY
ATTORNEY.

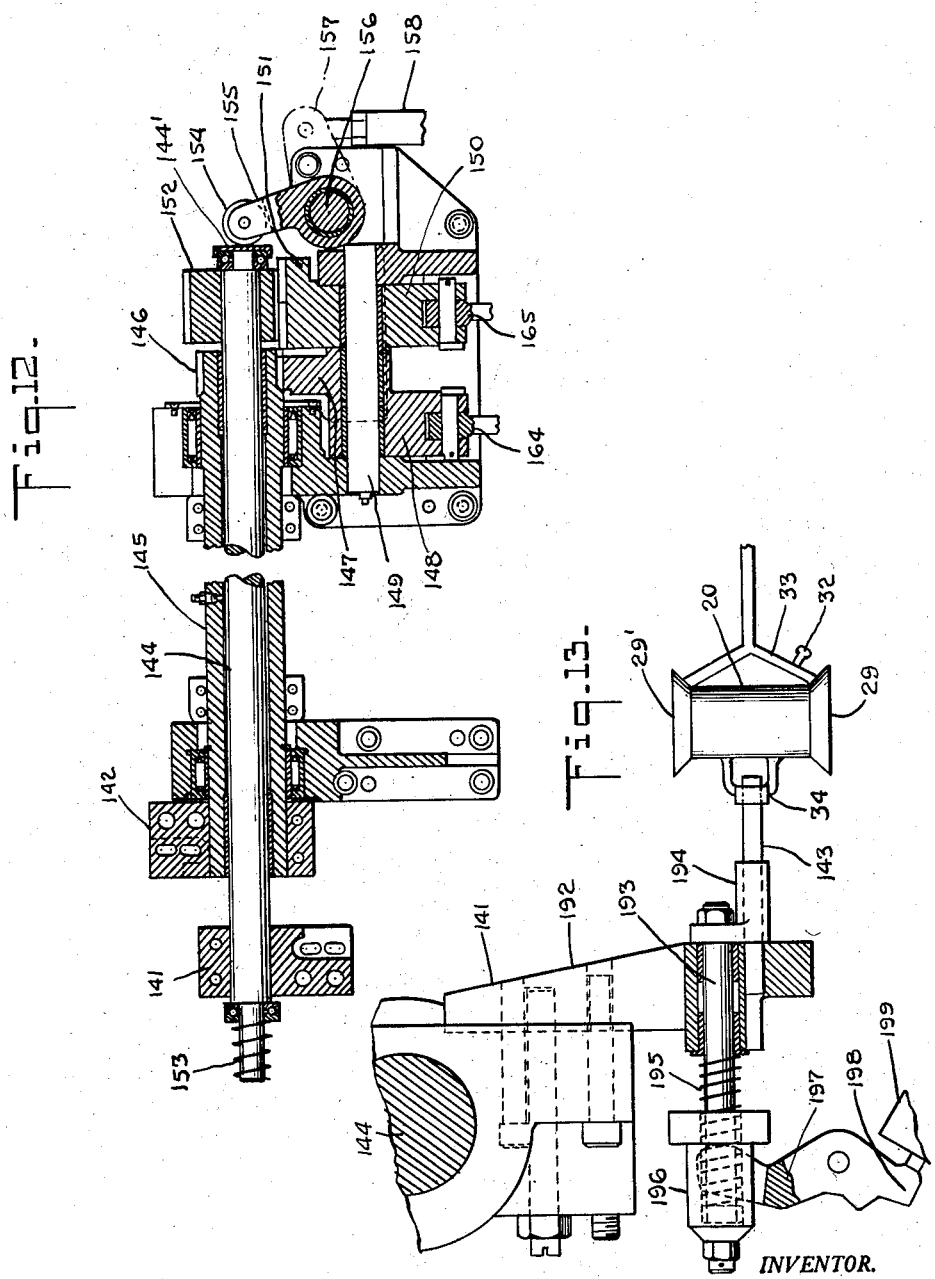

April 28, 1959 L. H. MORIN 2,883,707
MACHINE FOR MOULDING, FORMING AND TRIMMING PLASTIC PRODUCTS
Filed July 20, 1956 13 Sheets-Sheet 12
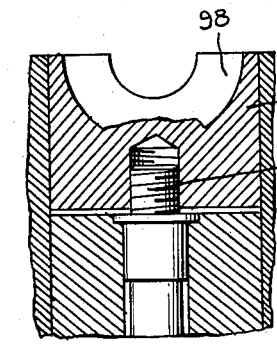
Fig.14.
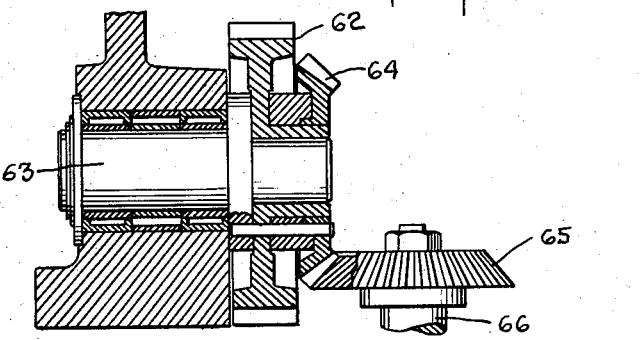
Fig.15.
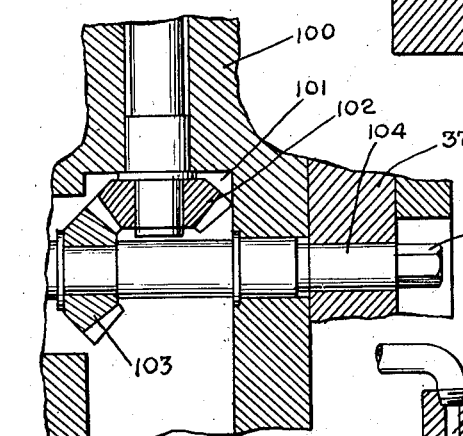
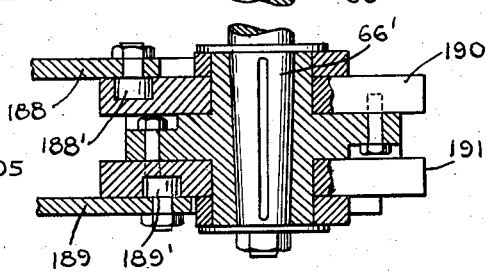
Fig.16.
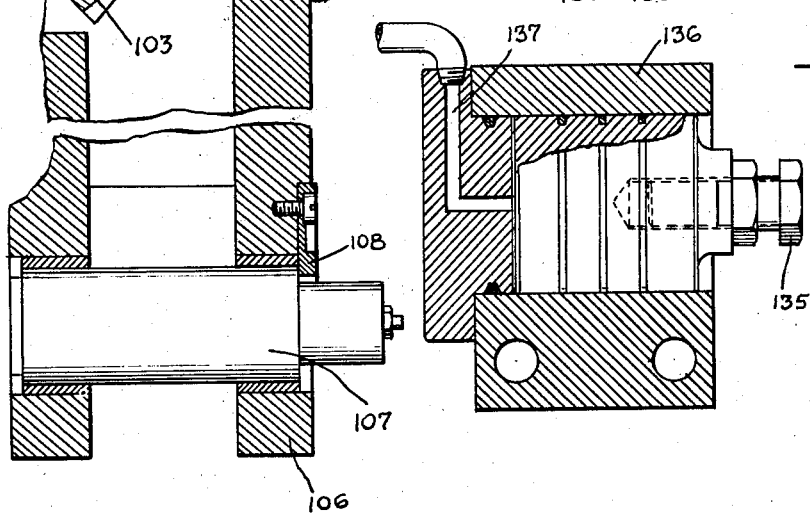
INVENTOR.
LOUIS H. MORIN
BY
*Howard E. Thompson*
ATTORNEY

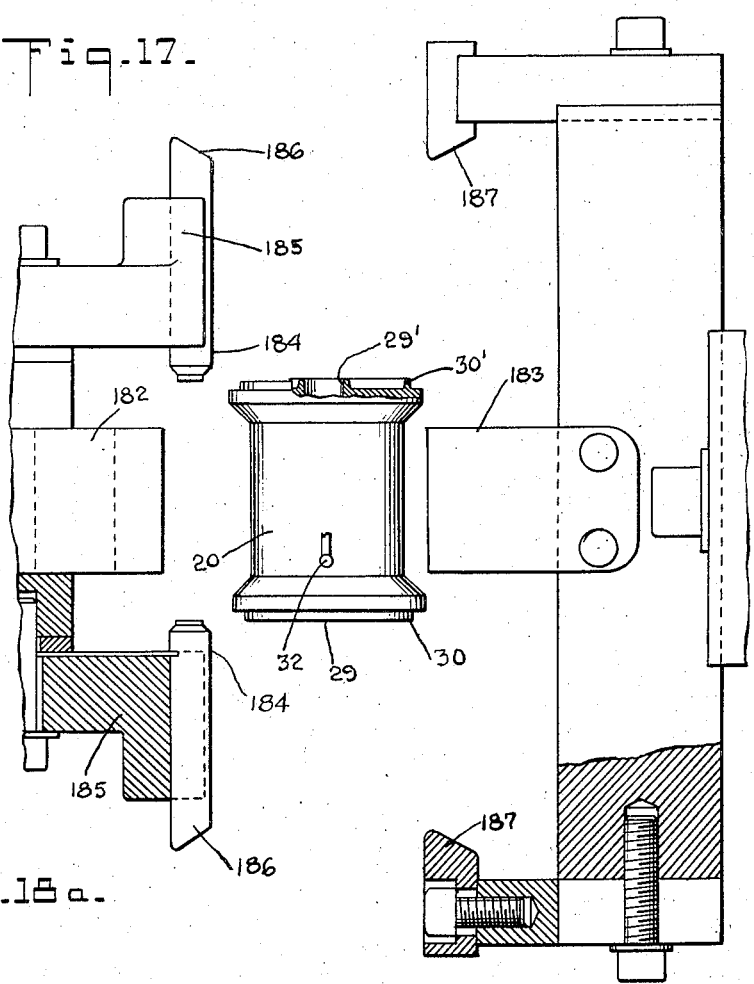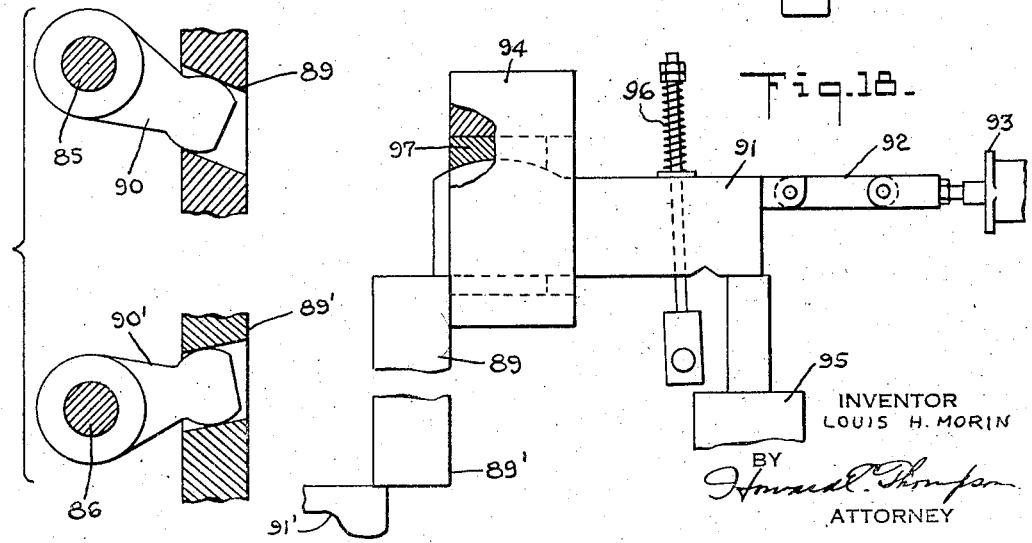

United States Patent Office 2,883,707
Patented Apr. 28, 1959

2,883,707

MACHINE FOR MOULDING, FORMING AND TRIMMING PLASTIC PRODUCTS

Louis H. Morin, Bronx, N.Y., assignor to Coats & Clark Inc., New York, N.Y., a corporation of Delaware Application July 20, 1956, Serial No. 599,084

23 Claims. (Cl. 18—30)

This invention relates to injection moulding machines for use in producing plastic products, wherein means is provided whereby, in the moulding of one product, a pre-moulded product is moved to and shaped and trimmed at a trimming station and then discharged from the machine.

More particularly, the invention deals with a machine of the character described employing a pair of injection cylinders intermittently brought into injection position with respect to the die or mould, whereby the resulting end products can be produced at relatively high speed.

Still more particularly, the invention deals with the production of cored products, wherein the cores are movable relatively to the die and, wherein, the products are formed on a pair of transfer fingers successively brought into casting position and utilized in removal of the products from the casting station to the trimming station, at which station, stripper means are employed for stripping gate portions from the respective fingers, preparatory to return of the fingers to the casting position between the dies.

The novel features of the invention will be best understood from the following description, when taken together with the accompanying drawings, in which certain embodiments of the invention are disclosed and, in which, the separate parts are designated by suitable reference characters in each of the views and, in which:

Fig. 4a is a view, similar to Fig. 4, showing the left side of the machine and illustrating the drive to the main cam shaft, the clutch operating mechanism and part of the cams at the left side portion of the machine.

Fig. 5 is a view, similar to Fig. 4a, showing the righthand end portion of the machine, including the diagrammatic showing of cams for actuating parts of the machine and also showing the valve cam shaft, including diagrammatically part of the valves actuated thereby.

Fig. 12 is a longitudinal broken sectional view through the transfer finger operating mechanism, with parts of the construction broken away and parts omitted.

Fig. 13 is a diagrammatic sectional view illustrating the stripper mechanism of one of the transfer fingers for removing the trimmed part of the casting from the transfer finger.

Fig. 14 is a diagrammatic broken sectional view through one of the dies and part of the die operating mechanism, illustrating means of adjustment for positioning of the die.

Fig. 15 is a broken sectional view, diagrammatically illustrating the drive to the trimming tools at the trimming station.

Fig. 16 is a sectional view through one of the hydraulic cylinders for applying final squeeze pressure to the die.

Fig. 17 is a diagrammatic sectional view, illustrating forming tools for shaping part of the moulded product, preparatory to trimming and ejecting the same from the machine.

Fig. 18 is a diagrammatic view showing the core backing means to resist injection pressure, part only of the lower core backup means being illustrated; and Fig. 18a is a diagrammatic sectional view showing the core shafts and the core operating levers of said shafts.

Figure 8:
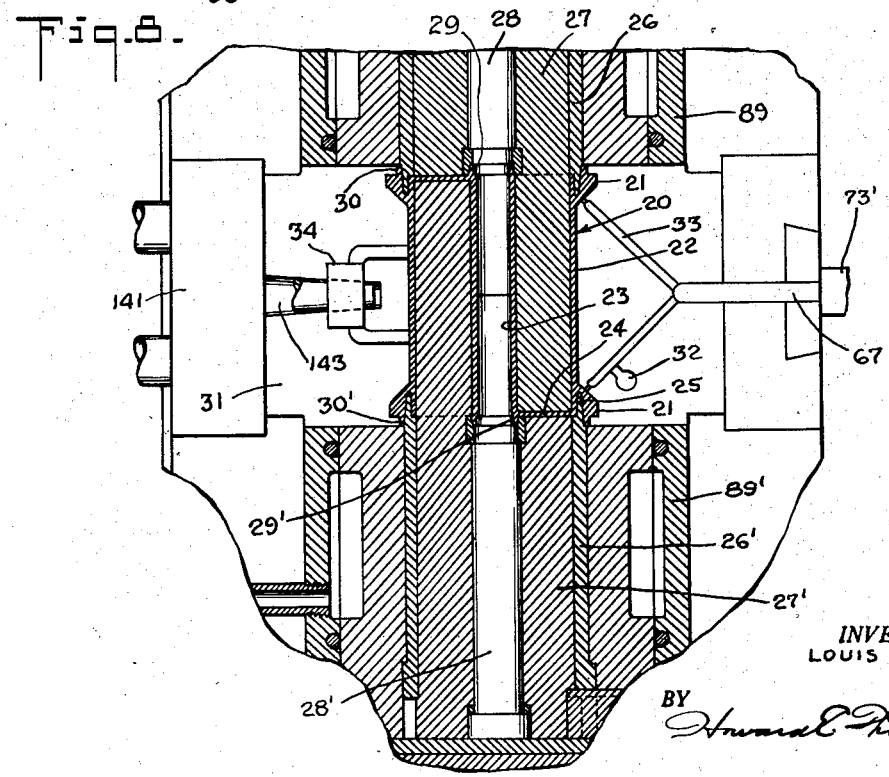
Fig. 8 is a vertical, sectional view through the parting line of the dies and illustrating the formation of a plastic spool in the die cavities and on the cores with the integral part formed upon one of the transfer fingers.

To illustrate one adaptation and use of my machine, I have shown the moulding of a plastic spool 20, note Fig. 8, having enlarged rim ends 21 at the ends of the barrel portion 22 of the spool. At 23 is shown the center tube which joins the barrel 22 in circumferentially spaced end walls 24. It will also appear that the rim ends have recesses 25 formed by sleeve core portions 26, 26' of upper and lower cores or core units 27, 27', the latter including core pins 28, 28' for forming the bore of the center tube 23.

At the ends of the center tube 23 are annular flanges 29, 29'. It will also appear that the core sleeves 26, 26', together with the dies, form, on the rims 21, other annular protruding flanges 30, 30'. One of the dies 31 is indicated in Fig. 8. The flanges 29, 29'; 30, 30' are utilized for attachment of labels to end portions of the resulting spool product, the spool product, in the construction shown, being what is generally known as a thread spool. In forming the spool 20, the dies are so fashioned as to mould a control flag 32 on the gate portion 33 and also to form a sleeve 34 on the transfer fingers, later described.

Figure 2:
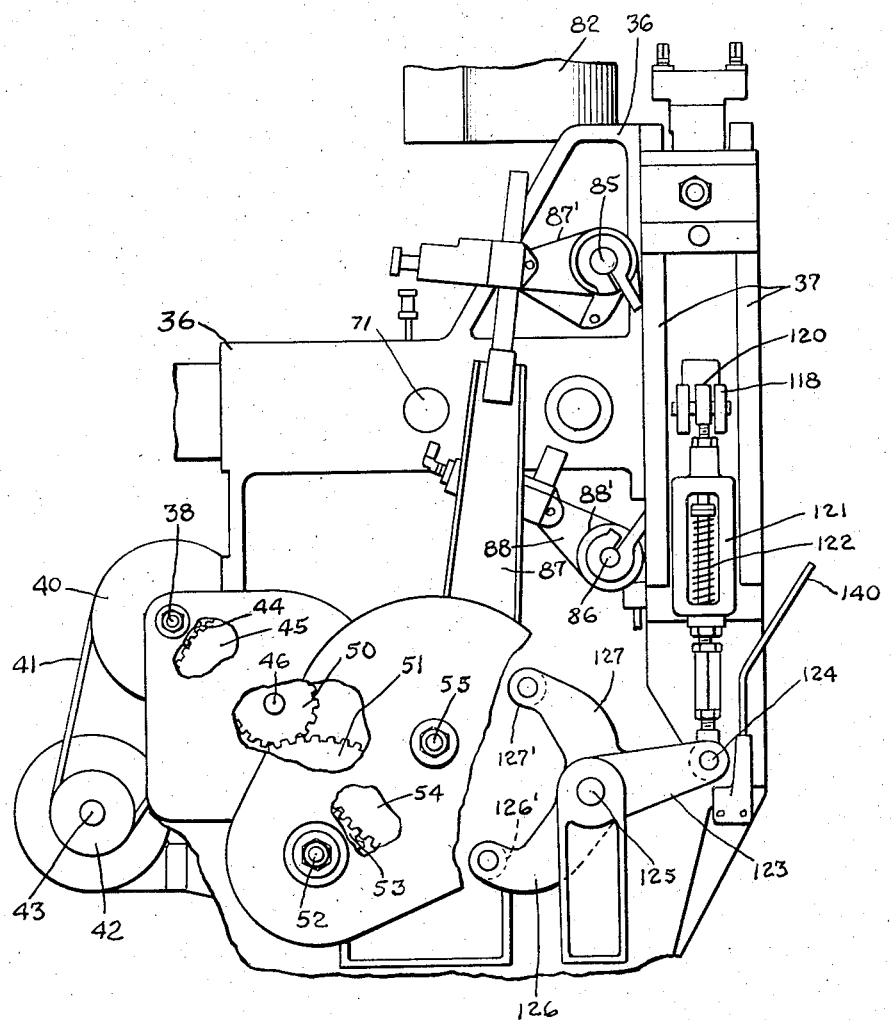
Fig. 2 is a diagrammatic view of the lefthand end portion of the machine, with parts of the construction broken away and omitted for sake of simplicity in the showing.
Figure 3:
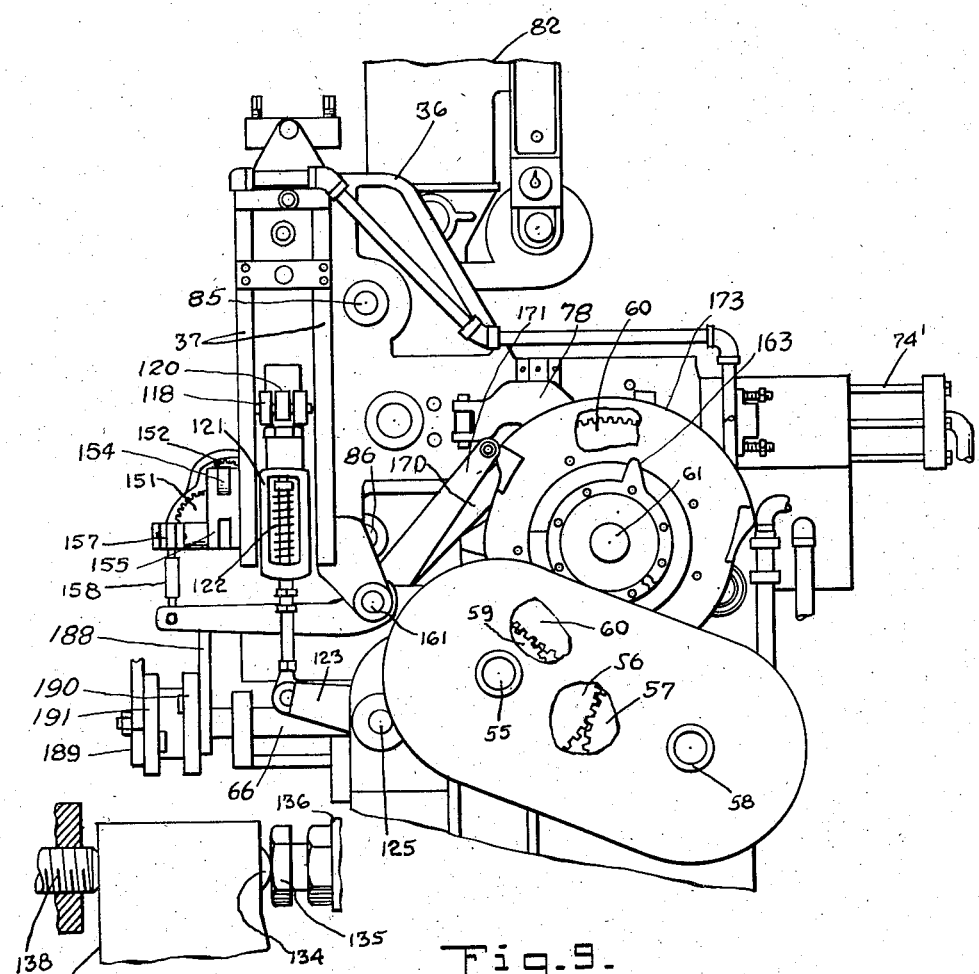
Fig. 3 is a diagrammatic view of the righthand end portion of the machine, with parts of the construction broken away and omitted for sake of simplicity.
Figure 4:
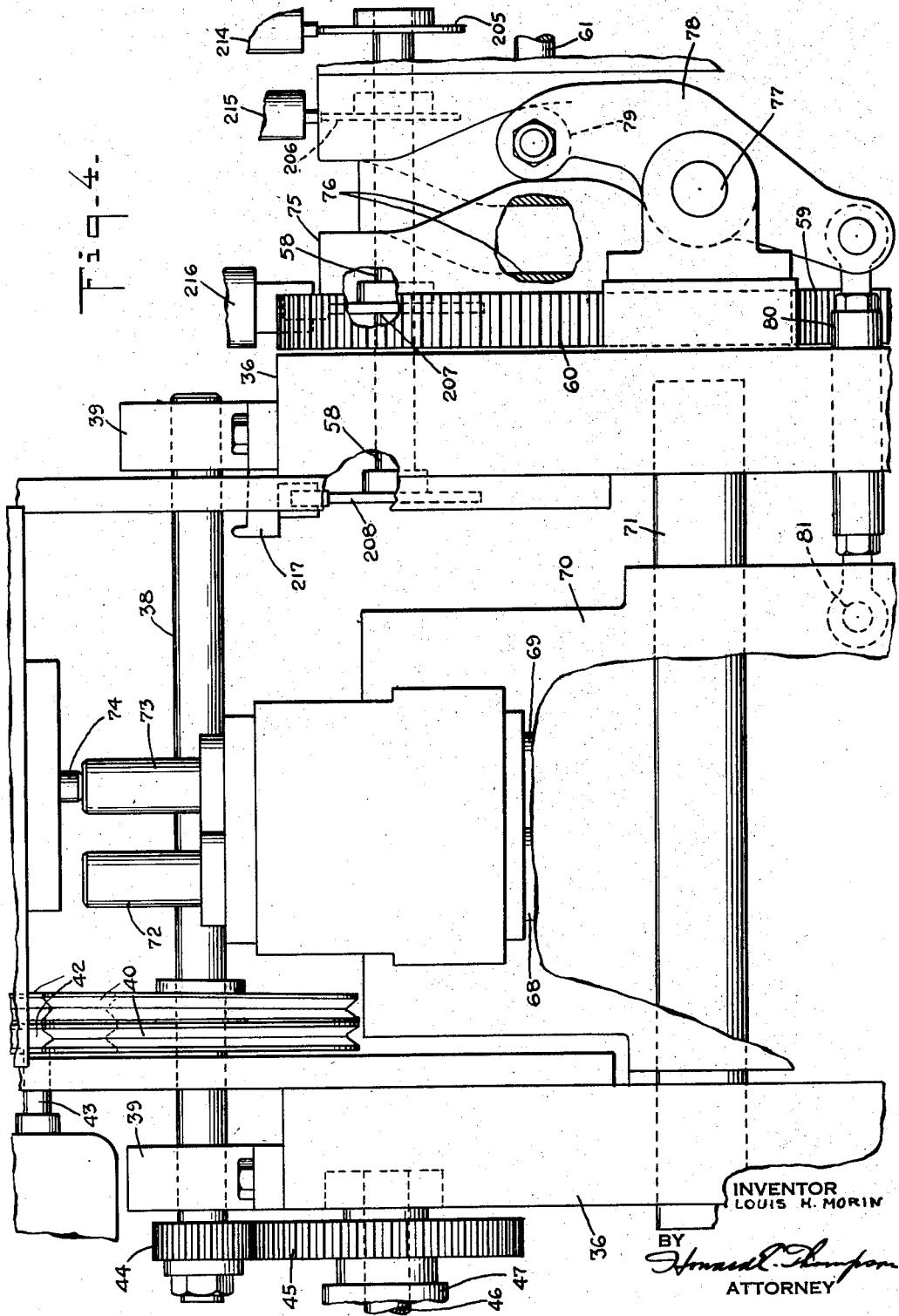
Fig. 4 is a schematic plan view of the rear central portion of the machine on an enlarged scale, with parts of the construction broken away and omitted to illustrate part of the shafting and the means actuating the pair of injection cylinders employed.

Turning now to the essential mechanisms of the machine, the frame of the machine comprises a base 35, including a pair of upright spaced frame members 36, parts of which are illustrated in Fig. 4 of the drawing, and a general outline, as viewed at the sides of the machine, is also indicated in Figs. 2 and 3 of the drawing. Supported upon the front of the upright frame members 36 are spaced plates 37, within and between which the dies, cores and the like operate.

In view of the fact that a machine of this type and kind includes many details, the showing in the several views have been simplified by omitting many of these details in order that the essential parts be more clearly represented. Aside from the use of brackets and other structural details, the parts 35, 36, including the plates 37, may be said to comprise the main general framework of the machine.

Turning now to Figs. 4, 4a and 5, it will be seen that in these figures is a diagrammatic showing of the valve shaftings and at least part of the cams and cam followers for actuating the various mechanisms of the machine and, with these figures, should be considered Fig. 15, showing the drive to the trimming tools.

In Fig. 4, 38 represents the main drive shaft arranged in suitable bearings 39 on the frames 36 at the back of the machine. On this shaft are a pair of pulleys 40 with belts 41 extending to a pair of pulleys 42 on the motor shaft 43. Note, in this connection Fig. 2 of the drawing. At one end of the shaft 38 is a pinion 44 meshing with a gear 45 on a clutch shaft 46, part of the clutch being diagrammatically seen at 47 in Figs. 4, 4a; at the end of the shaft 46 is a large handwheel shown, in part, at 48 in Fig. 4a and at 49 is shown, in part, a brake wheel, in conjunction with which a suitable brake operates for the quick stopping of the drive, as with other machines of this type and kind.

On the shaft 46 is a pinion 50 meshing with a gear 51 on an intermediate shaft 52. Fixed to the shaft 52 is a pinion 53, which meshes with a gear 54 on the main cam shaft 55 which extends through the entire width of the machine, the righthand end portion of this shaft being indicated in Fig. 5 of the drawing and on said end portion is a gear 56, which meshes with a gear 57 on a valve cam shaft 58.

On the cam shaft 55 is a gear 59 Figs. 3 and 4 which meshes with a gear 60 on a supplemental cam shaft 61, this last gear ratio being two-to-one, in other words, two revolutions of the main cam shaft 55 to one revolution of the supplemental cam shaft 61.

The gear 60 also drives a gear 62 on a stub shaft 63 at the right side of the machine Fig. 15. Fixed to the shaft 63 is a bevelled gear 64 which meshes with a corresponding gear 65 on a forwardly extending suitably supported shaft 66 for actuating the trimming tools.

The foregoing completes the essential drive to the various mechanisms of the machine.

Considering Fig. 8 of the drawing, 67 represents the sprue passage of the dies, into which heated plastic material is injected through the gates 33 to the cavities of the dies in forming the resulting end product, such, for example, as the spool 20.

For injection of the heated plastic material, I employ a pair of cylinders 68 and 69, shown in part in Fig. 4 of the drawing, and mounted in connection with a supporting frame 70 slidable on rods, one of which is indicated at 71, so that the respective cylinders can be brought into registering position with the passage 67 Fig. 8. At the rear end of the cylinders 68, 69 are plungers 72, 73, which are adapted to be brought into registering position with an hydraulically actuated injection plunger 74, the plunger 73 being shown in Fig. 4 of the drawing in alinement with the plunger 74 for discharge of plastic material from the cylinder 69 in Fig. 4 of the drawing, the hydraulic cylinder for actuating the plunger 74 being indicated at 74' Fig. 3.

On the shaft 61 is a double throw surface cam 75, the circumferential groove of which is indicated at 76. Pivoted, as seen at 77, is a cylinder actuating lever 78, having a roller 79 operating in the groove 76. To the other end of the lever is pivoted a connecting rod 80, which is pivoted to the casing 70, as seen at 81. It will, thus, be seen that, in each revolution of the shaft 61, both cylinders 68 and 69 will be brought into registering position with the plunger 74.

No specific showing is made of the feed of plastic crystals to the respective cylinders. However, in Fig. 3 of the drawing, I have indicated, in part, at 82, a hopper disposed at the top of the machine for intermittent delivery of crystals or powdered plastics to the respective cylinders. It will be understood that, as one cylinder is in the injection position, the plastic material of the other cylinder is being heated, preparatory to injection into the die, when moved into the injection position. This double cylinder construction increases the production speed of the machine, as will be apparent.

Figure 7:
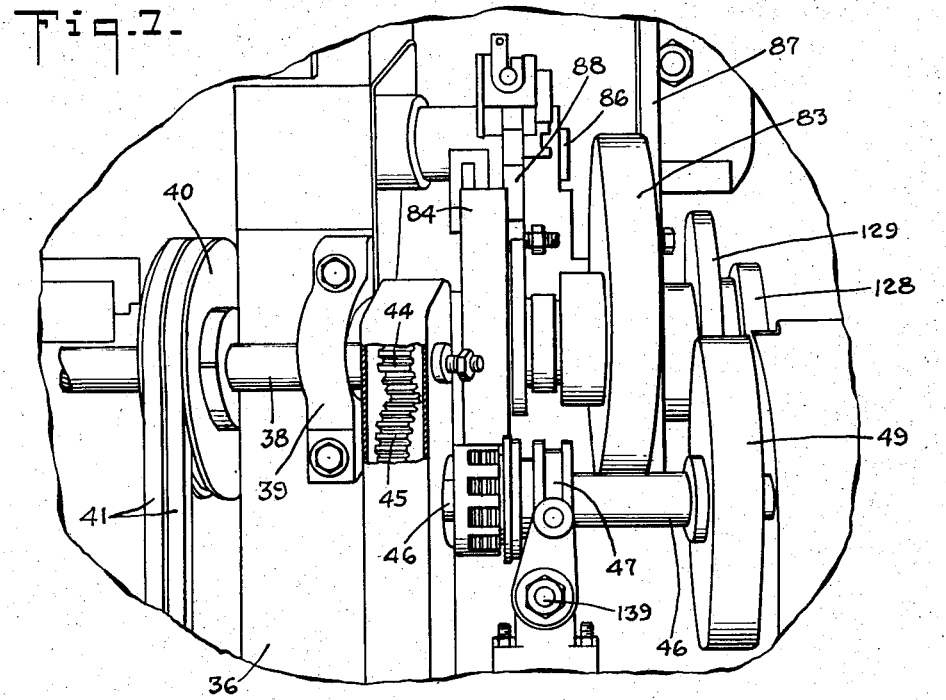
Fig. 7 is an isometric detail view of the rear portion of the left side of the machine and indicating part of the drive of the drive shaft, with parts of the construction broken away and parts in section.
Figure 10:
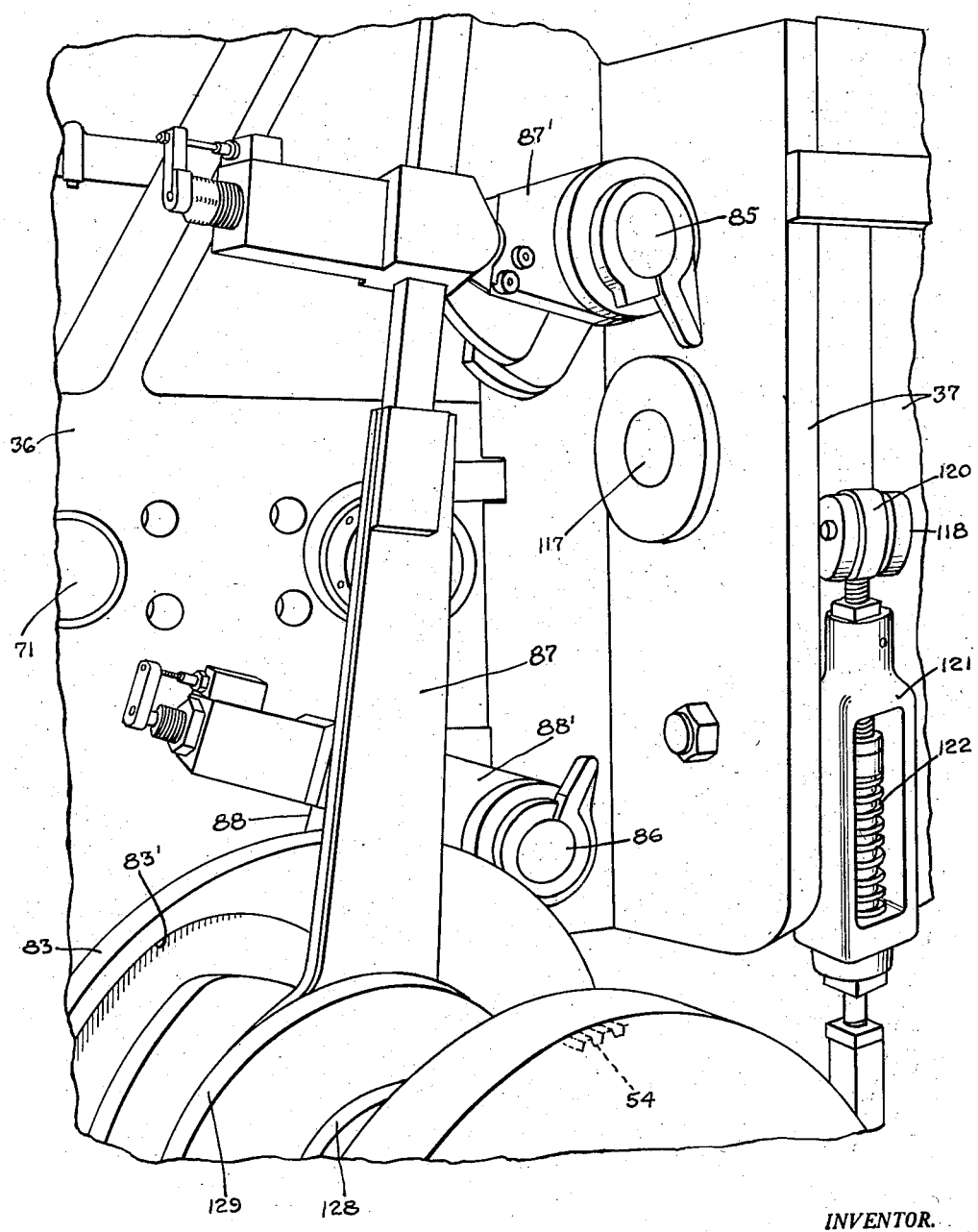
Fig. 10 is an isometric angular view of the upper portion of the left side of the machine to illustrate the core operating mechanism and part of one of the die operating means.
Figure 11:
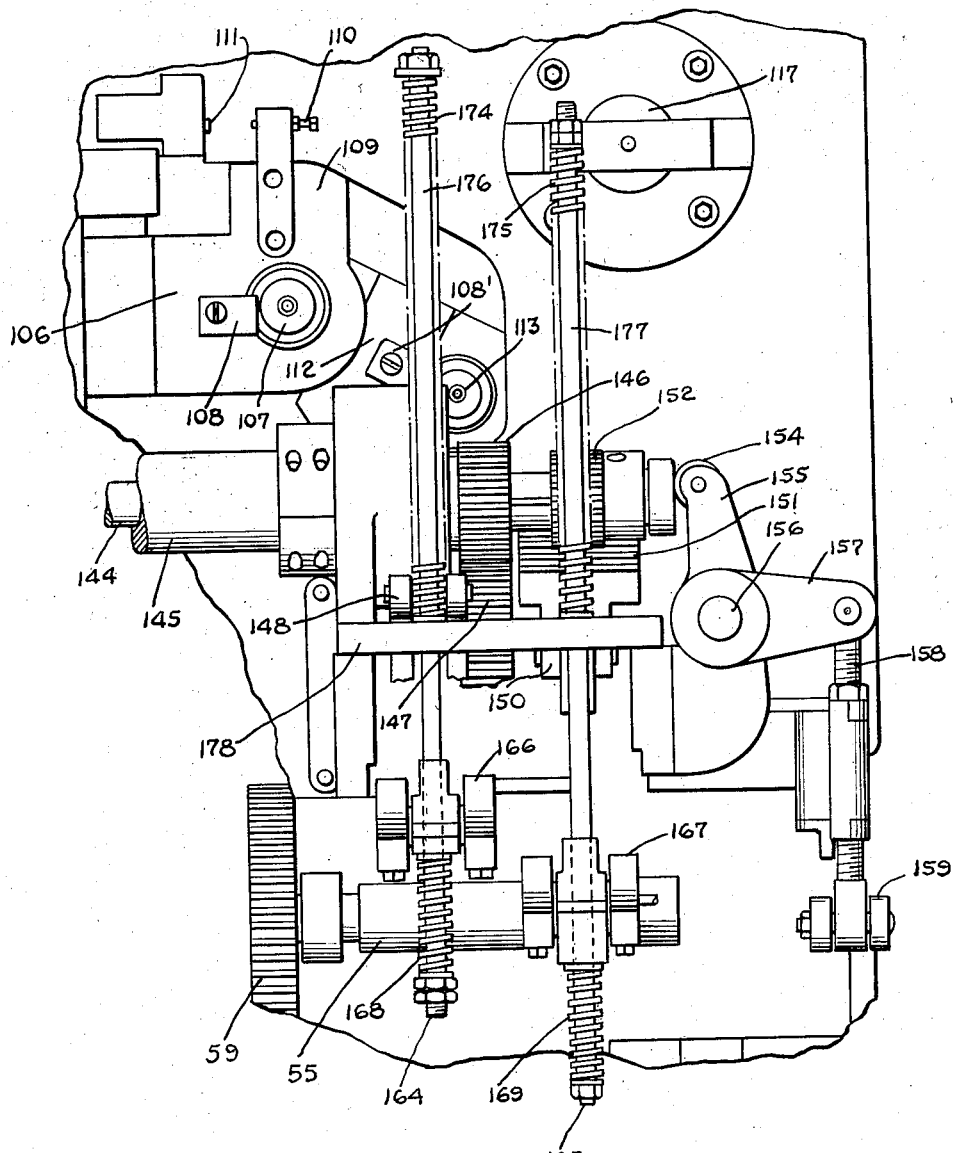
Fig. 11 is an enlarged front view of the right side of the machine, illustrating the transfer finger operating mechanism and also illustrating part of the righthand die operating mechanism and omitting background showing.

Considering now core operation and die operation, the cores 27, 27' Fig. 8 are moved toward and from each other by means of a top core cam 83 and bottom core cam 84, shown in Figs. 4a and 7 and mounted upon the main cam shaft 55. These cams actuate upper and lower shafts 85 and 86, respectively, note Fig. 10 of the drawing, through the medium of levers 87 and 88, which, in turn, are coupled with levers 87', 88' on the shafts 85, 86, respectively. The cams 83 and 84 are surface cams or, in other words, have grooves on the surface thereof, as illustrated, for example, by the groove 83' on the cam 83, as noted, in part, in Fig. 10 of the drawing. This arrangement will also be clear from the diagrammatic showing of Fig. 4a.

In Figs. 18, 18a, I have shown diagrammatically at 89, 89' upper and lower core carriers, which are actuated through levers 90, 90' on the shafts 85, 86, as noted in Fig. 18a.

In order to resist the pressure of the injection charge of the plastic material and to assure that the cores 27, 27' are moved and maintained in closed position, means is provided to apply pressure to the cores, as well as to definitely retain the cores in position and such means of the upper core is diagrammatically illustrated in Fig. 18 of the drawing and comprises a locking and pressure lever 91, part of a similar lever for the lower core being indicated at 91'.

At 92 is shown a linkage actuated by a two-way air cylinder 93 to move the lever 91 over the end of the carrier 89 adjacent a bearing support 94 for the lever 91. When the lever 91 is extended, as shown in the drawing, a hydraulic cylinder 95 is actuated against the surface of the lever to apply a pressure to the end of the lever engaging the carrier 89, moving the carrier slightly into the closed position. This operation is against the action of a spring 96. The rounded end of the lever 91 operates on a shoe 97 in the bearing 94, somewhat in the manner of a pivot to compensate for the slight swinging movement which is contributed to the lever 91 for the purposes described. It will be understood that the lever 91' is simultaneously actuated with a similar type of mechanism, as that disclosed in conjunction with the lever 91. Adjacent portions of the core carriers 89, 89' are indicated, in part, in Fig. 8 of the drawing. These carriers are water jacketed for cooling the cores. However, the flexible tubing leading to these water jackets are omitted from Fig. 1 of the drawing.

Turning now to the die operating mechanism, as both dies and the operating mechanism therefor are of the same construction, the brief description of one will apply to the other and, considering Figs. 8, 9, 11, 14 and 16, as well as Figs. 1, 2, 3 and 10, the various parts of this die structure and operating mechanism will be found. In Fig. 14, a section through one of the dies 31 is shown. Part of the die cavity for the moulded spool is indicated at 98.

Coupled with the die is a threaded rod 99 mounted in the die operating member 100, the member being recessed, as seen at 101, to receive a bevelled gear 102 fixed to the end portion of the rod 99 and meshing with another bevelled gear 103 on an adjustment rod 104 supported in the front frame plate 37, part of one of which only is seen in Fig. 14. The rod 104 has a hexagon head 105, by means of which the gear 103 can be rotated in correspondingly rotating the gear 102, so that the screw rod 99 can be finally adjusted, so as to position the die 31 with respect to the companion die to insure positive engagement of adjacent surfaces of the two dies.

Each die operating member 100 has a forked end portion 106, in which a transverse pivot pin 107 is mounted, the pin being held in position by a retaining plate 108. In this connection, note Fig. 9 of the drawing, in which figure the end 106 is illustrated as having an offset raised flange portion 109, with which is coupled an arm supporting an adjustable control screw 110 operating in conjunction with an air discharge 111, which controls stopping the machine, in the event that a die has not reached its fully closed position. One of these controls is for each die.

Mounted on the pin 107 is a link 112, the forked end of which carries a pin 113, similar to the pin 107, and held in place by a retaining plate 108', similar to the plate 108.

Mounted on the pin 113 is one end 114 of a lever, pivoted, as seen at 115, to the lower end of a high pressure lever 116, the latter being pivoted, as seen at 117. The other forked end 118 of the lever, pivoted, as seen at 115, supports a pin 119, with which the upper ring end 120 of an operating link 121 is coupled. The link 121 is disposed between the plates 37 at the end of the machine, as is clearly illustrated in Figs. 2 and 3 of the drawing, and shown, in part, in Fig. 10. The drive through the linkage 121 is through the medium of a heavy spring 122 disposed within the yoke portion of the link, so that, in the event of a foreign particle being positioned between adjacent surfaces of the dies, the operating linkage will yield to avoid breakage. The lower extension of each yoke link 121 is pivoted to a cam actuated lever 123, as seen at 124. Note Figs. 2 and 3 of the drawing. The lever 123 is pivoted, as seen at 125, and has two extensions 126 and 127 having rollers 126' and 127' at the ends thereof, which operate upon cams 128 and 129, respectively. Note, in this connection Fig. 4a of the drawing, the cams 128 and 129 being fixed to the cam shaft 55. These two cams 128 and 129 control the opening and closing movement of the dies through the levers and linkage noted in Fig. 9 of the drawing and, considering this figure, it will appear that the link 112 includes a shoe or enlargement 130, having a curved recess 131, which moves over the rounded end of the forked end 106. The shoe 130 has an extension 132 adapted to abut an enlargement 133 on the lever end 114 in providing a reinforced applied pressure to the die through the various linkage employed.

The upper end portion of the pressure lever 116 has, on its inner surface, a rounded button 134 adapted to be engaged by an adjustable pressure screw 135 actuated through the medium of a hydraulic cylinder 136, a sectional detail of which is shown in Fig. 16 of the drawing. The hydraulic medium from a source of supply is admitted through the port 137. Otherwise the structural details of the cylinder 136 are omitted.

It will also appear that an adjustable backup or stop screw 138 is employed to limit the operation of the lever 116. This final squeeze pressure, through the medium of the hydraulic cylinder, serves to securely hold adjacent surfaces of the dies in abutting engagement with each other and to resist the pressure of the injection of the plastic material into the die cavity.

Figure 1:
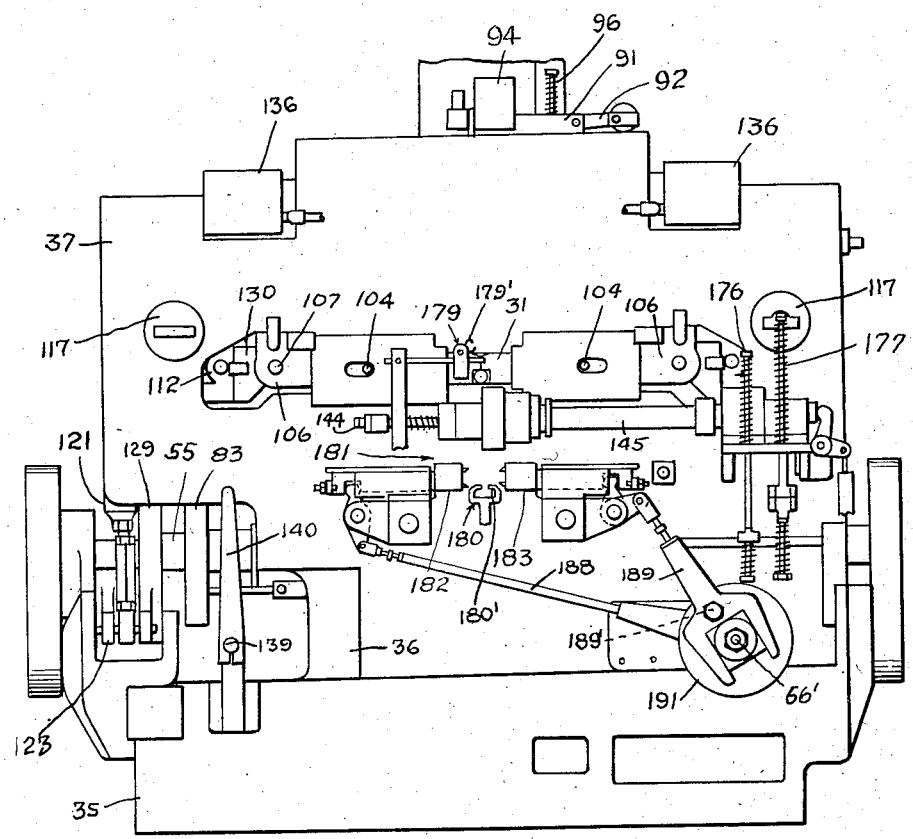
Fig. 1 is a diagrammatic front view of the machine, with numerous parts removed, omitted or broken away for simplicity in the illustration.

It will appear, from a consideration of Figs. 1, 2 and 4a, that a suitably supported clutch operating shaft 139 is arranged at the left side of the machine and has, at its forward end, an upwardly and outwardly extending lever 140 for rotating the shaft to throw the clutch 47 into operative engagement. Various controls are provided for releasing the clutch and applying a brake, not shown, to the brake wheel 49 in stopping the machine but, as such controls, in themselves, form no part of the invention, they are not dealt with specifically, although periodic mention thereof will be made throughout.

A pair of transfer finger units 141 and 142, note Fig. 12, are employed, the unit 141 being the lefthand unit and the unit 142 being the righthand unit, and these units are so operated as to position the finger 143, note Fig. 8 of each of these units, in position between the dies 31 to receive the moulded sleeve 34 of the moulded product, so as to transfer the product 20 from the casting station to the trimming and shaping or forming station, later described. As the fingers 143 of both units are the same and these units are generally of the same construction, the brief description of one unit will otherwise be applicable to both and, for identification purposes, the unit 141 is shown, in part, diagrammatically in Fig. 8 of the drawing.

While one unit is in the casting position or registering with the casting station, the other unit is registering with the trimming station. In the intermittent movement of these units to the respective stations, the righthand unit 142, Figs. 6, 12, simply travels in an arc without any lateral shifting; whereas, the unit 141 moves, let us say, from the casting station to the left and, then, forwardly, passing through a control station and by-passing the unit 142, then moves to the right to a position common with the center line of the dies and downwardly to enter and be positioned at the trimming and forming station.

In the reverse movement, the unit 141 moves upwardly and then to the left again by-passing the now downwardly swinging unit 142 and then again to the right for centralization between the dies prior to closing the dies.

In Fig. 12 of the drawing is shown a diagrammatic broken sectional part of the transfer finger operating mechanism and, in said figure, 144 is an elongated shaft arranged in suitable bearings, the finger unit 141 being fixed to the shaft 144 and this shaft is slidably mounted in a tubular shaft 145 supported in other bearings, the other unit 142 being fixed to one end portion of the shaft 145.

The tubular shaft 145 has, at the other end, a pinion 146 meshing with a gear segment 147 of a lever 148 rotatable about a suitably supported stub shaft 149. Also mounted on the shaft 149 is another lever 150 having an elongated gear segment 151, with which a gear 152, fixed to the shaft 144, operates, so that a constant engagement is maintained with the lever 150 as the shaft 144 is moved into its several positions.

The spring 153 operates upon the left end portion of the shaft 144 to normally maintain the disc end 144' of the shaft in engagement with the roller 154 of an operating lever 155, pivoted as seen at 156. The lever 155 includes an extension 157, with which an operating link 158 is pivoted. Note, in this connection, Fig. 11 of the drawing. The lower end portion of the link 158 is pivoted in the yoke end 159, Fig. 5, of a long offset lever 160 pivoted on a stub shaft 161, the other end 162 of the lever operating upon a cam 163 on the shaft 61. In other words, the cam 163 controls the intermittent left and right movement of the transfer finger unit 141.

Pivoted in the yoked ends of levers 148 and 150 are rods 164 and 165, Fig. 12, which are coupled with yoke end portions of levers 166 and 167, respectively, said levers also being pivoted around the shaft 161, Fig. 5. Below the levers 166 and 167 the rods include springs 168, 169, note Fig. 11 of the drawing, which yieldably maintain the levers 166 and 167 in operative engagement with the levers 148 and 150, respectively. The levers 166 and 167 include long extensions 170 and 171, Fig. 5, having roller ends, which operatively engage cams 172 and 173, respectively, on the shaft 61. The rollers of the lever extensions 170, 171 are maintained in constant engagement with said cams by springs 174 and 175, Fig. 11, arranged upon rods 176, 177 which pass through a horizontal backup plate 178 for support of the springs, the lower ends of the rods 176, 177 being pivoted to the free ends of the levers 166, as noted in Fig. 5 of the drawing.

From the foregoing, it will be apparent that the cams 172 and 173 control rotary operation of the transfer finger units 141 and 142 in intermittently moving the same to the casting and trimming stations, as noted above.

Figure 6:
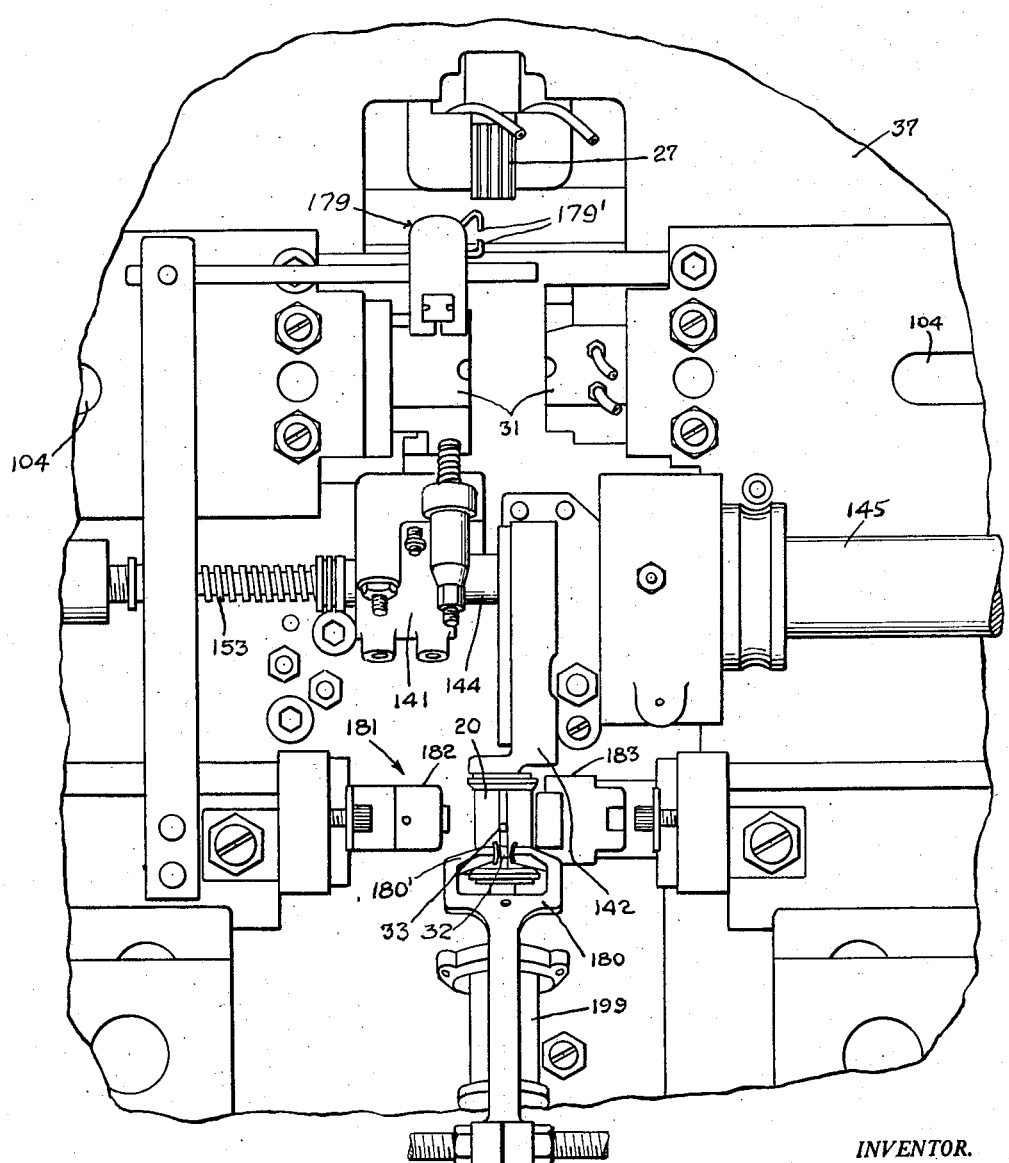
Fig. 6 is an enlarged front view, diagrammatically illustrating the dies and one of the cores in open position and showing one transfer finger in a partially raised position and the other transfer finger in its lowered position.

Arranged and suitably supported at the front of the machine are two double nozzle control stations 179 and 180, having pairs of air nozzles 179' and 180' spaced apart sufficiently to receive the flag 32 cast integrally with the gate 33, note Fig. 8, the stations in question being shown diagrammatically in Fig. 6 of the drawing. The station 179 is adapted to receive the flag of a spool moved from the casting station in the downward path and the operative mechanism for the transfer finger unit 141 operates to bring the flag 32 momentarily in position between the nozzle 179', so as to block the passage of air across the gap of the nozzles, thereby continuing operation of the machine. However, if a flag should not appear at the proper time, the continuation of a blast of air across the nozzles would cause the machine to be stopped by suitable controls. This same control is provided for the spool supported on the unit 141 when said unit is at the trimming station, generally identified by the reference character 181. When at this station, the flag 32 will be positioned between the nozzles 180' and the same control takes place. These latter nozzles also control the flag of the spool moved from the casting station to the trimming station 181 by the unit 142. This unit does not, however, stop at the station 179. In this connection, it will be apparent that the control unit 179 is disposed at the left of the path of travel of the transfer finger unit 142.

The transfer finger unit 141 has an intermittent rocking or, in other words, downward and upward movement when in alinement with the nozzles 179', preparatory to the lateral movement to the right of the unit 141 to swing downwardly into proper position at the trimming station 181.

At the trimming station are a pair of trimming tools 182 and 183 moved toward and from each other to trim the moulded spool in removal of the gate 33 as well as removal of that part of the casting including the sleeve 34.

Also mounted in connection with the supports for the tool 182 are a pair of forming tools 184 slidably mounted in brackets 185 and having bevelled ends 186 operatively engaging shoes 187 on the support for the tool 183, so that, as the trimming tools 182 and 183 are brought together, the forming tools 184 will be moved along the axis of the spool 20, note Fig. 17, to slightly form the flanged ends 29, 29' for the purpose of partially retaining labels forced over these formed flanges against displacement from the spool. The labels, however, are attached in a separate operation and preferably in a separate machine. However, the forming or shaping operation at the trimming station prepares the spool for the label assemblage, as will be apparent.

The tools 182 and 183 are actuated through levers 188 and 189 pivotally coupled with the tool slides, the levers having rollers 188', 189', note Fig. 15, operating in the grooves of a pair of cams 190, 191, respectively, keyed to the tapered end 66' of the shaft 66. The operation of the trimming tools to move the same toward and from each other is controlled downwardly through the cams 190 and 191.

In Fig. 13 of the drawing, I have indicated part of the core pin unit 141 with the core pin 143 as part of a bracket portion 192 of said unit. Slidably mounted in the bracket 192 is a plunger rod 193, with one end of which is coupled a stripper sleeve 194 slidable on the pin 143 for removal of the sleeve 34 from the pin, after said part has been trimmed from the spool 20. A spring 195 normally supports the stripper 194 in inoperative position.

Mounted on the other end of the rod 193 is a flanged sleeve 196 which operates upon the spring 195 in movement of the rod 193 by an operating lever 197, which engages the flange of the sleeve 196. The other end portion 198 of the lever 197 is actuated through the medium of a compressed air cylinder 199 and this cylinder, together with the lever 197, is so positioned at the trimming station 181 as to receive corresponding sleeves 196 of the respective finger units 141, 142. At the proper instant, air is introduced into the cylinder 199 to actuate the lever in movement of the stripper 194 into operative position.

The trimmed spool 20, as well as the removed parts 33, 34, are dropped into suitable receptacles which are not shown for purpose of simplicity.

Turning now to the valve shaft 58, diagrammatically shown in Figs. 4 and 5, this shaft has fixed longitudinally thereof a series of cams 200, 201, 202, 203, 204, shown in Fig. 5, and 205, 206, 207 and 208, shown in Fig. 4. Adjacent the respective cams 200 to 208 are suitably supported control valves 209, 210, 211, 212, 213, 214, 215, 216 and 217, respectively, the several cams being so arranged and timed to actuate the several mechanisms controlled by said valves and, while no attempt will be made to trace these valves to the respective mechanisms, the valves will be associated with the mechanisms controlled as follows.

Figure 9:
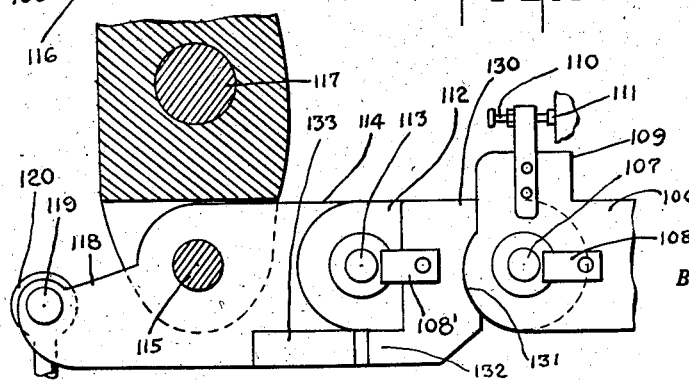
Fig. 9 is an enlarged detail view, with parts in section, of the lefthand die operating mechanism, including part of the means applying final squeeze pressure upon the die.

The valve 209 controls the die closing and supplies air to the pair of discharges, one of which is shown at 111 in Fig. 9 of the drawing. If the discharge is not closed by a screw 110, the machine is automatically stopped.

The valve 210 controls the supply of air to the pairs of nozzles 179' and 180' Fig. 6 for purposes previously described.

The valve 211 controls supply of air to the cylinder 199 in actuation of the stripper 194 Fig. 13.

The valves 212 and 213 control the air cylinder 93 Fig. 18 in moving 91 into operative and inoperative positions and this applies to both of the core units.

The valve 215 is an hydraulic valve which controls the supply of hydraulic medium to the cylinder 95.

The valve 214 is an hydraulic valve and controls pressure engagement of the nozzle ends of the injection cylinders 72 and 73 with the die, part of one of the nozzles 73' being indicated in Fig. 8 of the drawing. In other words, suitable means is provided to forcefully retain the nozzle ends in engagement with the die during the injection shot. Thereafter, the nozzle is moved away from the die by suitable springs, not shown, and this applies to both cylinders.

The hydraulic valve 216 controls the supply of hydraulic medium to the cylinder 74' for actuation of the plunger 74 Fig. 4.

The hydraulic valve 217 controls the supply of hydraulic medium to the two cylinders 136 Fig. 9 for application of the servo-squeeze pressure to the dies in securely holding the dies in operative position.

It will appear, from a consideration of Figs. 3 and 5 of the drawing, that the valve cam shaft 58 is in a one-to-one drive relationship with the main cam shaft 55; whereas, the main cam shaft 55 rotates two revolutions to each single revolution of the shaft 61. In other words, in each cycle of operation of the machine, a spool is formed at the casting station while, at the same time, a pre-cast spool is being shaped and trimmed at the trimming station. In like manner, the two injection cylinders 68 and 69 are intermittently brought into registering position with the dies and the dies and cores complete their cycle of operation, namely opening and closing, in each primary cycle of operation of the machine.

In the isometric view, Fig. 7, part of the gearing has been shown in protective housings in order to simplify this illustration. The gears are amply indicated in other views. The same is also true in the isometric view of Fig. 10 and, in Figs. 2 and 3, part only of the gearing is shown with these housings broken away.

It is also to be understood that no attempt is made to show the various parts or mechanisms of the machine, that is to say, the cams and parts operated thereby in any one particular position of operation of the machine, as the several views have been shown to simply indicate different positions of the parts, but, in the cycle of operation of producing two moulded and trimmed spools, the following will be an illustration.

If we start this operation with the dies closed, as diagrammatically seen in Fig. 1, and with the left transfer pin or unit 141 in position between the dies, the operation is as follows.

In this position, a pre-cast moulded spool on the right-hand transfer unit 142 will be at the trimming station, after the spool has been cast around the cores 27, 27', as noted in Fig. 8, and the sleeve 34 formed on the pin 143, whereupon the cams 83 and 84 will operate to first separate the cores 27, 27'; whereupon, the cams 128, 129 will operate to separate the dies 31, and, the transfer finger units will be put into operation through the cams 163, 172 and 173 to first swing the transfer unit 141 outwardly and then to the left while beginning to raise the unit 142. The unit 141 then is given the intermittent rocking movement with respect to the nozzles 179', during which operation the transfer unit 142 passes the unit 141 and the unit 141 swings partially to the right and then downwardly in passing 142 and then moves further to the right for proper alinement with the trimming station 181 and for positioning the flag 32 between the nozzles 180'. At this time, the pin 143 of the unit 142 is in proper position between the dies, the cores are moved into operative position and the dies closed about the cores and, simultaneously, the trimming tools 182, 183 are actuated, during which operation the forming tools 184 are actuated to form the flanges 29, 29' and the spool is then trimmed to remove the gate 33 and sleeve 34, at which time, the stripper 194 is actuated to remove the sleeve 34 from the pin 143. During this forming and trimming and stripping operation, the second spool has been formed on the pin 143 of the unit 142; whereupon, the cores and dies are again separated, as stated above, the unit 141 is moved to the left and upwardly, now by-passing the unit 142, which swinging in one path to its downward position with the flag 32 of the spool 20 formed on the pin of the unit 142 positioned between the nozzles 180' at the trimming station 180. The other unit 141, after by-passing the unit 142, is then moved to the right for centralized position between the dies; whereupon, the cores and dies are again moved into closed position and another or third successive spool is cast upon the pin 143 of the unit 141 and, during this last casting operation, the spool, upon the pin 143 of the unit 142, is formed and trimmed at the station 181 in the same manner as the forming and trimming of the previously described spool. These cycles of operation continue in the automatic production of the products in question.

During these several operations, the various other cams are actuated for the different controls of the machine. Here, it is to be kept in mind that other controls are employed, some of which are illustrated, for example, in Fig. 10, but these controls are not described for the reason that automatic stop controls are commonly employed in various types and kinds of machines and, in themselves, form no particular part of the invention.

It will be apparent that the trimming tools 182, 183 move into supporting engagement with the spool 20 in the forming operation by the tools 184, as will be apparent from a consideration of Fig. 17 of the drawing.

Having fully described my invention, what I claim as new and desire to secure by Letters Patent is:

1. A casting machine, comprising a pair of dies at a casting station, means for moving the dies toward and from each other, a pair of transfer units said units each comprising a part adapted to be arranged between the dies and exposed to the cavity of the dies, means for pressure injecting heated material into the die cavity in forming a product casting, including a gate and a sleeve on said part of one unit, a trimming station spaced with respect to said casting station, means for operating said units to position the second unit at the trimming station when the first unit is at the casting station, a pair of trimming tools at said trimming station, means for moving said trimming tools toward and from each other in trimming the gate and sleeve from the product when positioned at said station, the means for operating one of said units swinging said unit in a straight path between the casting and trimming stations, the means for operating the other unit swinging said unit in an irregular path between said stations and by-passing said first unit, and means, positioned at the trimming station, for stripping said cast sleeve, when trimmed from the product, from said part of each unit when positioned at the trimming station.

2. A machine as defined in claim 1, wherein means is provided to apply hydraulic squeeze pressure to the dies when in closed position.

3. A machine as defined in claim 1, wherein the die moving means comprises cam actuated levers at opposed sides of the machine, actuating link lever assemblages disposed vertically and horizontally with respect to said dies.

4. A machine as defined in claim 3, wherein the linkage for each die includes yieldable relief means.

5. A machine as defined in claim 1, wherein the gate of each cast product includes a flag portion, and control means comprising spaced pairs of air nozzles disposed in the path of travel of said transfer units, said machine being responsive to the passage of air between said nozzles of each pair, and said flag portion being movable to a position between each pair of nozzles to help control operation of the machine.

6. A machine as defined in claim 1, wherein a pair of cores are arranged between the dies when in closed position, and means for operating said cores to move the same toward and from each other, together with movement of the dies in freeing a cast product for movement by the transfer units from the casting station to the trimming station.

7. A machine as defined in claim 6, wherein hydraulically operated means is employed in backing-up the cores, when in closed position, within the dies to resist pressure of material injected into the die cavity.

8. A machine as defined in claim 1, wherein manually operated means is provided for adjustment of each die to insure positive engagement of adjacent surfaces of the dies when in closed position.

9. A machine as defined in claim 1, wherein the means for pressure injection of heated material comprises a pair of adjacent cylinders, a single hydraulic pressure medium for actuation of each of said cylinders, and means for actuating the cylinders to intermittently position the respective cylinders in alinement with the dies and said pressure medium.

10. A machine as defined in claim 9, wherein the cylinders are mounted in a casing, and means comprising a cam actuated lever and linkage coupled with said casing for positively moving the cylinders intermittently into injection position.

11. In a machine of the character described, a casting station, including a pair of dies, means for moving the dies toward and from each other, a pair of core units at said station, means for moving said units toward and from each other and for positioning within the dies when in closed position, said units and dies collectively forming the cavity of a product to be cast, said product including removable gate and transfer sleeve portions, a pair of injection cylinders for pressure injection of casting material into said cavity, a single pressure medium for actuating each of said cylinders, means for moving the cylinders intermittently into injection position between the dies and said pressure medium, a pair of transfer units each including a finger adapted to be arranged in the die cavity to receive said cast sleeve, means for moving one transfer unit in a single path between said casting station and a trimming station, means for moving the other transfer unit in an intermittent and variable path between said stations and by-passing said first transfer unit, a pair of trimming tools at said trimming station, means for operating said tools to trim the gate and sleeve portions from the cast product, and means positioned at the casting station for actuating a stripper to remove the cast sleeve from said finger of each transfer unit when positioned at said trimming station.

12. A machine as defined in claim 11, wherein one cylinder forms a cast product on the finger of one transfer unit, the other cylinder forms a cast product on the finger of the other transfer unit, and, further, wherein one transfer unit is positioned at the trimming station when the other of the units is receiving a cast product at the casting station.

13. A machine as defined in claim 11, wherein the gate of each casting includes a flag, and control means is provided in the path of travel of each product by said transfer units, with which said flags are adapted to register to insure operation of the machine.

14. A machine as defined in claim 11, wherein means is provided for applying hydraulic squeeze pressure upon each of the dies when said dies are in closed position.

15. A machine as defined in claim 11, wherein hydraulically operated back-up and pressure elements are employed for each core unit when in closed position to resist pressure injection of casting material into the die cavities and around said core units.

16. A machine as defined in claim 11, wherein the cast product formed in said dies includes a formable part, and means, at said trimming station, for fashioning said formable part while supported at said station.

17. A machine as defined in claim 11, wherein the first named transfer unit is arranged upon an oscillating tube, and the second transfer unit is disposed on an oscillating shaft within said tube and movable longitudinally of the tube.

18. A machine as defined in claim 17, wherein tensional means is employed for moving the second named transfer unit longitudinally of said tube in one direction.

19. A machine as defined in claim 11, wherein the dies include carriers, and manually adjustable means in said carriers for adjusting the dies for bringing adjacent surfaces of the dies into close proximity to each other when the dies are in closed position.

20. In a casting machine employing spaced casting and trimming stations, a pair of dies at the casting station, a pair of trimming tools at the trimming station, a pair of transfer units, each unit including a pin adapted to be positioned within a cavity of the dies for reception of a part of the resulting casting formed in said cavity, means for actuating said units for movement thereof to position the pin of one unit within the dies when the pin of the other unit is supporting a cast product at the trimming station, said actuating means of one unit moving said unit in a fixed arcuate path between said stations, the means for actuating the other unit moving said other unit in a variable arcuate path from the casting station to the trimming station and back to the casting station, by-passing the first named unit in both of these movements, and means, at the trimming station, for stripping the part cast on the pin of each unit when positioned at the trimming station.

21. In a casting machine having spaced first and second stations, said first station comprising a pair of relatively movable dies, a pair of injection cylinders for pressure injection of casting material to said dies, a single pressure medium for actuating each of said cylinders, means for moving the cylinders intermittently into injection position between the dies and said pressure medium, a pair of transfer units, means for actuating said units for movement thereof back and forth between said stations so that one unit is at the first station while the other is at the second station, each unit having means for receiving a product cast thereon by said dies at the first station, one of said cylinders being movable into injection position to inject casting material to the dies to cast a product on one of said units, the other cylinder being movable into injection position to inject casting material to the dies to cast a product on the other unit, said actuating means for one unit moving said unit in a fixed path between said stations, said actuating means for the other unit moving said other unit in a variable path between said stations so as to by-pass said one unit, and means at the second station for stripping said product from each unit.

22. The casting machine of claim 21 wherein forming means are disposed adjacent said second station for shaping a cast product while the latter is disposed on a transfer unit.

23. In a casting machine having spaced casting and trimming stations, a pair of transfer units, means for actuataing said units for movement thereof back and forth between said casting and trimming stations so that one unit is at the casting station while the other is at the trimming station, each unit including a pin for receiving a part of a cast product at the casting station and for supporting said product at the trimming station, said actuating means for one unit moving said unit in a fixed path between said stations, said means for actuating the other unit moving said other unit in a variable path between said stations so as to by-pass said one unit, and means adjacent the trimming station for stripping said part cast on the pin of each unit.

References Cited in the file of this patent
UNITED STATES PATENTS

| 1,756,602 | Morris et al. | Apr. 29, 1930 |
| 2,367,303 | Morin | Jan. 16, 1945 |
| 2,374,468 | Von Opel | Apr. 24, 1945 |
| 2,423,914 | Wacker | July 15, 1947 |
| 2,447,101 | Stock | Aug. 17, 1948 |